(Model.)
J. P. VAN VLECK.
Combined Corn and Pumpkin Seed Planter.
No. 239,893.                                   Patented April 5, 1881.
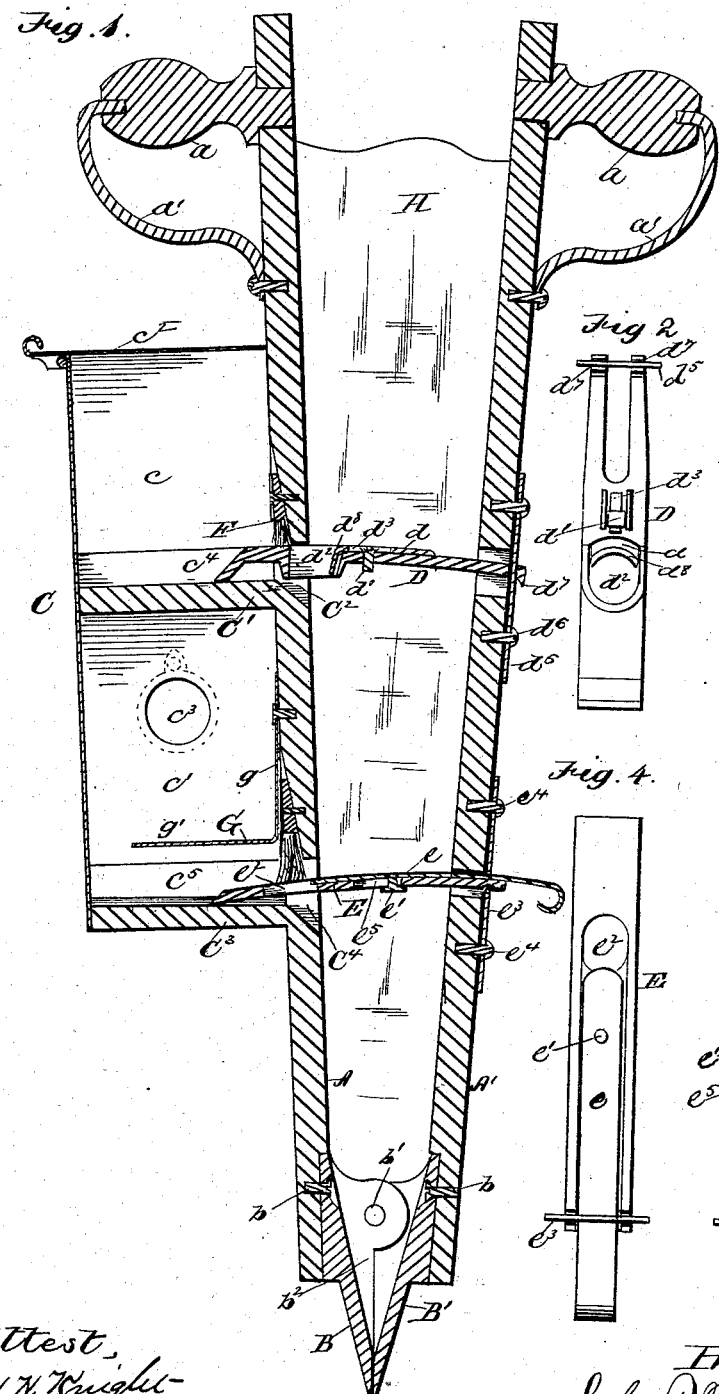
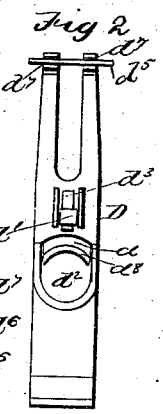
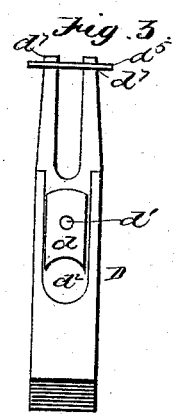
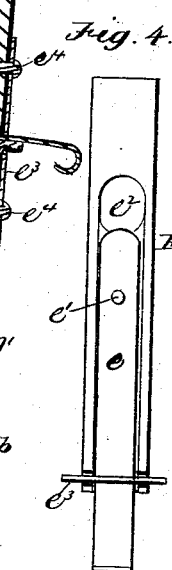
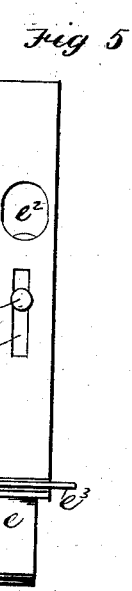
Attest,
W. H. H. Knight
Moses Foskey Jr
Inventor,
John P. Van Vleck
by S. S. Kirk
Atty.

UNITED STATES PATENT OFFICE.

JOHN P. VAN VLECK, OF COOKSVILLE, WISCONSIN.

COMBINED CORN AND PUMPKIN-SEED PLANTER.

SPECIFICATION forming part of Letters Patent No. 239,893, dated April 5, 1881.

Application filed February 19, 1881. (Model.)

*To all whom it may concern:*

Be it known that I, JOHN P. VAN VLECK, a citizen of the United States, residing at Cooksville, in the county of Rock and State of Wisconsin, have invented certain new and useful Improvements in Combined Corn and Pumpkin-Seed Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In the drawings, Figure 1 represents a vertical longitudinal section of my improved hand seeder or planter. Figs. 2 and 3 represent, respectively, bottom and top plan views of the upper dropping-slide; and Figs. 4 and 5 represent top and bottom plan views of the lower dropping-slide.

Similar letters of reference in the several drawings denote similar parts.

Hand seeders or planters as heretofore constructed and as at present in use are, as a rule, open to many and serious objections, chief among which is the liability of the seeds being presented edgewise to the dropping-slide, and thus, when said dropping-slide is withdrawn from the seed box or holder, being broken or otherwise injured and rendered unfit for use by contact with the sides of the slide-opening. This is especially true as regards thin seed, such as pumpkin, squash, &c. Another objection to many hand-seeders as at present in use is the cumbrous or unwieldy form or manner in which they are constructed, this being due to the position of the seed-boxes—*i. e.*, one upon each of the side pieces, such position being heretofore deemed necessary to enable two or more kinds of seed to be dropped or planted at one operation.

To remedy the above-mentioned defects, and at the same time to provide a simple, durable, and more cheaply constructed and easily operated hand seed-planter, is the object of the present invention.

The invention will be more particularly pointed out in the claims.

Referring to the drawings, A A' are the side pieces, of convenient length, provided at their upper ends with handles $a$, said handles being further strengthened by brace-rods $a'$.

To the lower ends of each of the side pieces, A A', I secure by bolts or screws $b$ the metal plates or shoes B B', whereby the incision is made in the earth, pivoting the same together at a point, $b'$, near their upper ends, as shown.

It will be observed from the drawings that a wedge-shaped chamber, $b^2$, will be formed within the plates or shoes, the object of which is to hold the dropped grain or seed until a suitable drill or hole has been made in the earth wherein to deposit said seed, such deposit being accomplished by pressing or closing the upper ends of the side pieces and withdrawing the implement from the earth when the sides are so closed.

To one of the side pieces, A, I attach a seed-box, C, the sides of which I preferably make of tin or sheet-iron. I divide the box C into two compartments, $c\ c'$, the upper of which, $c$, is provided with a sliding cover, $c^2$, access being had to the lower through an opening in one of its sides, closed by a swinging flap, $c^3$, as shown. The bottoms of the seed-compartments are preferably of wood; the upper, C', is provided upon its upper side with a rectangular recess, $c^4$, that extends from end to end thereof, to receive and accommodate the sliding seed-dropping bar D, which passes into the compartment $c$ through an opening, $C^2$, in the side A. The bottom of the opening is beveled downward, as shown. The opposite end of the bar D is preferably bifurcated, its extreme end being attached to the side A' by means of small hooks or flanges $d^7$, that pass through openings in the plate $d^5$, secured by means of screws $d^6$ to the outside of the side piece, A'. The plate $d^5$ is made adjustable by means of slots, through which the screws $d^6$ pass, to compensate for the wear of the parts. The free end of the bar D is beveled downward, and thus passes readily under the seed. An opening, $d^2$, is provided in the bar D, said opening being capable of holding a number of grains of seed. When opened to its full extent the size of the opening is regulated by a slide, $d$, provided with a slot, $d^3$, through which passes a screw, $d'$, thereby securing said slide $d$ to the bar D. A small flange, $d^3$, is formed upon the outer end of the slide $d$. Said flange, extending downward and into the seed-opening $d^2$, regulates the size of said opening when the slide is moved, as will be understood. The bottom $C^3$ of the lower compartment, $c'$, is also made of wood, and is provided with a groove having its sides $c^5$ beveled outward and downward, to receive and direct the seed upon the lower seed-dropping slide, E, which passes through an opening, $C^4$, in the side A. The bar E is pivoted to a plate, $e^3$, held upon the side A by means of screws $e^4$ passing through slots in said plate. The bar E is provided with an opening, $e^2$, the size of which opening is regulated by a sliding plate, $e$, placed on the top of the bar E, and held to said bar by a screw, $e'$, which passes through a slot, $e^5$, in said bar. The outer end of the plate extends outward through the plate $e^3$, and serves the double purpose of a handle to operate the plate, and as a means for locking the bar E to the plate $e^3$, as will be readily understood from the drawings.

I provide the openings $C^2$ $C^4$ with small brushes F, whereby any surplus seed is swept from the bars D and E.

To further insure the proper delivery of seed to the lower bar, E, I provide the outer side of the side A, within the compartment $c'$, with a distributing-plate, G, one part of which, $g$, is secured to the side A by a screw, while the portion $g'$ extends outward and nearly covers the bottom $C^3$. The purpose of the plate G is to prevent the mass of seeds from lodging upon the plate E, allowing only a small quantity to fall to the plate, and, further, directing such seed to the plate in such manner that all danger of injury to the seed is obviated.

I further provide the sides of the seeder with a flexible cover, H, as cloth or rubber, for the purpose of directing the seed to the chamber $b^2$ in the shoe B.

Having thus described my invention, what I claim is—

1. In a hand seed-planter, the single seed-box C, having the two compartments arranged on one side of the planter, substantially as and for the purpose set forth.

2. In a hand seeder or planter, the combination of the two-part seed-box C with the distributing-plate G, brushes F, and dropping-slides D and E, said slides having "cut-off" or gage plates $d$ $e$, constructed and arranged as described, whereby seed may be taken from one or both of the compartments $c'$ $c$ of the box C at one and the same time, substantially as described, and for the purpose specified.

In testimony whereof I affix my signature in presence of two witnesses.

JOHN P. VAN VLECK.

Witnesses:
 E. A. HOXIE,
 B. S. HOXIE.